Mar. 3, 1925.
S. KLOTZ
AUTO BUMPER
Filed May 24, 1922
1,528,617
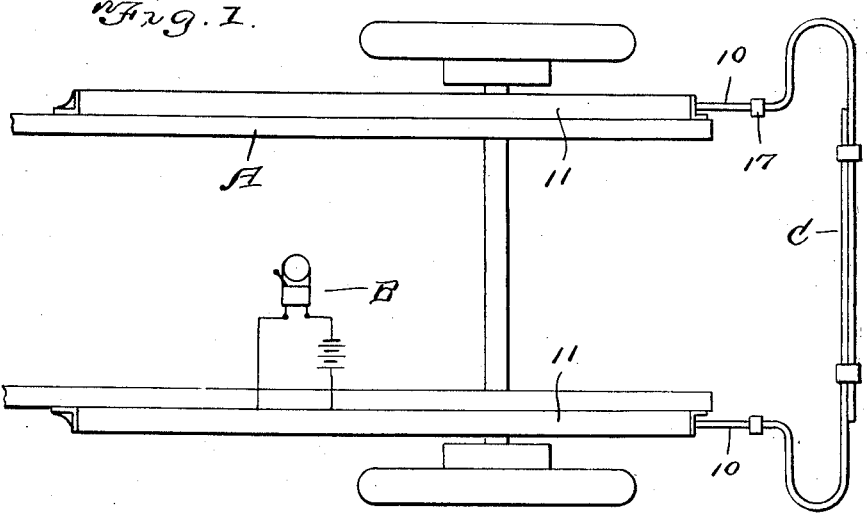
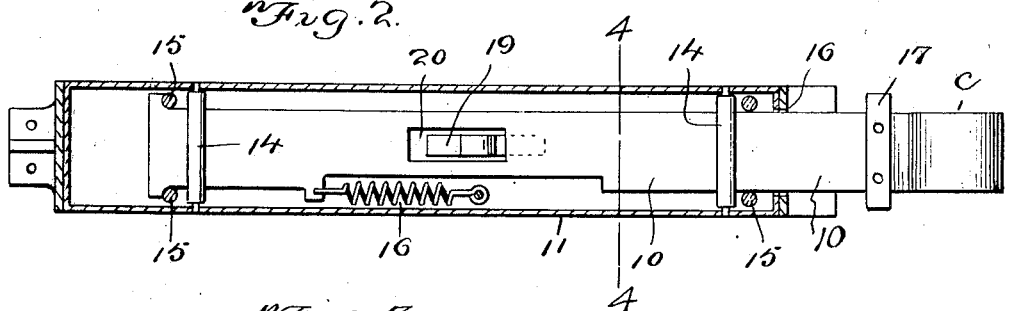
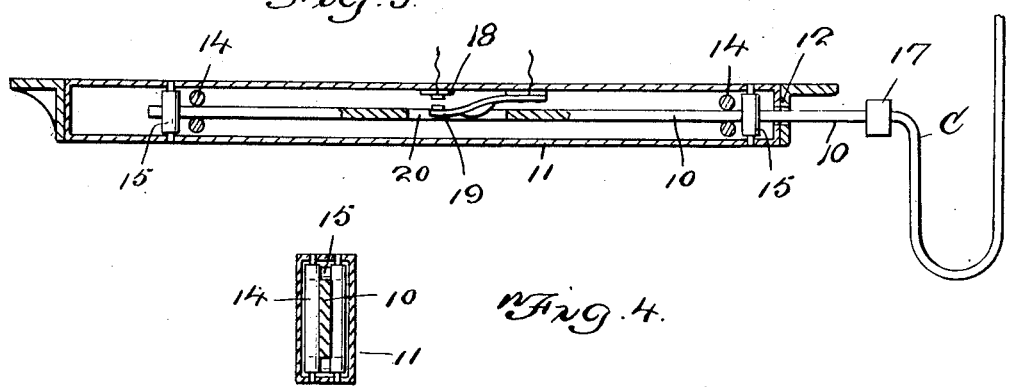
S. Klotz
INVENTOR
BY Victor J. Evans
ATTORNEY
WITNESS:

Patented Mar. 3, 1925.

1,528,617

UNITED STATES PATENT OFFICE.

SOL KLOTZ, OF NEW YORK, N. Y.

AUTO BUMPER.

Application filed May 24, 1922. Serial No. 563,354.

*To all whom it may concern:*

Be it known that I, SOL KLOTZ, a citizen of the United States, residing at New York, in the county of New York and State of New York, have invented new and useful Improvements in Auto Bumpers, of which the following is a specification.

This invention has for its chief characteristic, the provision of a signal adapted for use with motor operated vehicles or the like, and which signal is operated by means of a bumper arranged upon the rear of the vehicle, so that when this bumper is brought into contact with an object incident to backing the vehicle, he will be thus informed so as to avoid injury to the object or the vehicle with which the signal is equipped.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1 is a fragmentary plan view of the running gear of a vehicle, showing the application of the invention.

Figure 2 is a longitudinal sectional view through one of the bumper casings.

Figure 3 is a similar view taken at a right angle to Figure 2.

Figure 4 is a sectional view taken on line 4—4 of Figure 2.

Referring to the drawing in detail, A indicates the rear portion of the frame of a vehicle, while B indicates generally an electrically operated signal, preferably in the nature of a bell, and which signal can be located at any desired place on the vehicle. This bell is suitably connected in circuit, and the circuit is closed to sound the signal incident to the movement of the bumper C forwardly of the frame.

The bumper C is of usual construction, except that it is provided with spaced parallel portions 10, each of which is arranged to slide in a casing 11. There are two of these casings, and the latter are secured to the sides of the frame A, and each casing is substantially of rectangular formation in cross section.

Each casing is closed at both ends, except for the slots 12 through which the parallel members 10 pass between spaced pairs of vertical and horizontally disposed rollers indicated at 14 and 15 respectively, these rollers serving to maintain the parallel members 10 in proper position within their casings and at the same time minimize friction. Arranged within each casing is a coiled spring 16, one end of which is secured to the casing, and the other end secured to the adjacent parallel member 10 of the bumper, and these springs function to normally maintain the bumper in its entirety, in an extended position, or in other words, projecting from the rear of the vehicle. The rollers 15 in each casing constitute stops, which limit the outward movement of the bumper under the influence of the springs 16, and the parallel members 10 are designed to engage these rollers for this purpose. Each parallel member 10 is provided with lug 17, which is adapted to contact the adjacent end of the casing, to limit the inward movement of the bumper. Secured within one casing 11, is a fixed contact 18, and a movable contact 19, the latter being in the nature of a leaf spring which is curved longitudinally, and normally disposed within a slot 20 formed in the adjacent parallel member 10 of the bumper. Manifestly, the movable contact 19 is normally spaced from the fixed contact 18, but incident to the inward movement of the bumper under conditions above stated, the movable contact is engaged by one wall of the slot 20, and forced into engagement with the fixed contact 18, closing the circuit and sounding the signal B. It is of course to be understood, that vehicles are generally reversed or backed very slowly, and damage notwithstanding, frequently results when the vehicle is brought into contact with some fixed object. However, with the present invention, under the same circumstances, the bumper C will yield, and the signal will be sounded before any damage results.

What is claim is:—

1. In combination with an automobile frame, of a pair of tubular members arranged upon opposite sides of the frame and extending longitudinally thereof, rollers arranged in the tubular members, a bumper arranged in advance of the frame and having parallel arms slidably received in the tubular members and engaged by the rollers, lugs carried by the arms and adapted to engage certain of the rollers to limit the movement of the bumper in either direction, and resilient means normally urging the bumper in a forward direction.

2. A bumper actuated circuit closer including spaced elongated casings, a bumper having parallel portions slidable within said casings, spaced pairs of vertically and horizontally disposed rollers, between which the parallel portions of the bumper operate, yieldable means for normally holding the bumper in a projected position.

In testimony whereof I affix my signature.

SOL KLOTZ.